(12) United States Patent
Holmes

(10) Patent No.: US 10,012,049 B2
(45) Date of Patent: Jul. 3, 2018

(54) PROOF TESTING APPARATUS AND METHOD FOR REDUCING THE PROBABILITY OF FAILURE ON DEMAND OF SAFETY RATED HYDRAULIC COMPONENTS

(71) Applicant: Hydril USA Distribution LLC, Houston, TX (US)

(72) Inventor: John Steven Holmes, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 15/160,073

(22) Filed: May 20, 2016

(65) Prior Publication Data
US 2016/0340998 A1 Nov. 24, 2016

Related U.S. Application Data

(60) Provisional application No. 62/164,086, filed on May 20, 2015.

(51) Int. Cl.
| | |
|---|---|
| *E21B 33/064* | (2006.01) |
| *E21B 33/06* | (2006.01) |
| *E21B 34/16* | (2006.01) |
| *G01M 3/28* | (2006.01) |
| *E21B 47/06* | (2012.01) |

(52) U.S. Cl.
CPC ............ *E21B 33/064* (2013.01); *E21B 33/06* (2013.01); *E21B 33/063* (2013.01); *E21B 34/16* (2013.01); *G01M 3/2876* (2013.01); *E21B 47/06* (2013.01)

(58) Field of Classification Search
CPC ...... E21B 33/06; E21B 33/063; E21B 33/064; E21B 33/0355; E21B 34/16; G01M 3/2876
See application file for complete search history.

(56) References Cited

U.S. PATENT DOCUMENTS

| | | | |
|---|---|---|---|
| 4,046,191 A | 9/1977 | Neath | |
| 7,706,980 B2 * | 4/2010 | Winters | ................ E21B 33/064 702/12 |
| 8,403,053 B2 | 3/2013 | Judge | |

(Continued)

OTHER PUBLICATIONS

PCT Search Report and Written Opinion issued in connection with Corresponding Application No. PCT/US2016/033459 dated Sep. 19, 2016.

*Primary Examiner* — Matthew R Buck
(74) *Attorney, Agent, or Firm* — Hogan Lovells US LLP

(57) ABSTRACT

A blowout preventer (BOP) safety system for testing the integrity of safety valves at the sea floor is disclosed. The system includes a BOP stack including a BOP, the BOP comprising a BOP shear ram and a first hydraulic circuit, the first hydraulic circuit in fluid communication with the BOP shear ram and having an open side and a close side. The system further includes a manifold, wherein the manifold is disposed proximate to and in fluid communication with a dump valve, a first sensor, and a supply valve and a first safety valve disposed between and in fluid communication with the manifold and the BOP on the close side, wherein the dump valve is operable to allow flow from the BOP to the manifold through the safety valve, and wherein the first sensor is operable to detect the flow from the BOP to the manifold.

18 Claims, 3 Drawing Sheets

(56) References Cited

U.S. PATENT DOCUMENTS

| | | | |
|---|---|---|---|
| 8,781,743 B2* | 7/2014 | McKay | E21B 33/064 |
| | | | 175/25 |
| 9,429,010 B2* | 8/2016 | Winters | E21B 47/06 |
| 2010/0300696 A1 | 12/2010 | McCalvin | |
| 2011/0098946 A1 | 4/2011 | Curtiss, III | |
| 2015/0094866 A1 | 4/2015 | Pereira et al. | |
| 2015/0096758 A1 | 4/2015 | Babbitt | |
| 2015/0123022 A1 | 5/2015 | Meraz et al. | |
| 2016/0290889 A1* | 10/2016 | Hilpert | E21B 33/06 |
| 2016/0327447 A1* | 11/2016 | Hilpert | E21B 33/061 |
| 2016/0334300 A1* | 11/2016 | Hilpert | E21B 47/1025 |

\* cited by examiner

PROOF TESTING APPARATUS AND METHOD FOR REDUCING THE PROBABILITY OF FAILURE ON DEMAND OF SAFETY RATED HYDRAULIC COMPONENTS

RELATED APPLICATIONS

This application is a non-provisional application claiming priority to U.S. Provisional Application No. 62/164,086, filed May 20, 2015, the disclosure of which is expressly hereby incorporated herein by reference in its entirety.

BACKGROUND

1. Field of Invention

This disclosure relates in general to testing equipment on blowout preventer (BOP) systems for operability and wear. More specifically, this disclosure relates to testing the operation of valves in a BOP system subsea before, during, and after closed high-pressure BOP testing.

2. Related Technology

BOP systems are hydraulic systems used to prevent blowouts from subsea oil and gas wells. BOP equipment typically includes a set of two or more redundant control systems with separate hydraulic pathways to operate a specified BOP function. The redundant control systems are commonly referred to as blue and yellow control pods. In known systems, a communications and power cable sends information and electrical power to an actuator with a specific address. The actuator in turn moves a hydraulic valve, thereby opening fluid to a series of other valves/piping to control a portion of the BOP.

Many BOP systems are required to be safety integrity level (SIL) compliant. In addition, most modern BOP systems are expected to remain subsea for up to 12 months at a time. In order to decrease the probability of failure on demand, BOP control valves need to be tested while they are subsea without requiring extra opening and closing cycles of the BOP or requiring additional high pressure hydraulic cycles to close the bonnets solely for testing purposes. Various types of control systems can be safety rated against a family of different standards. These standards may be, for example, IEC61511 or IEC61508. Safety standards typically rate the effectiveness of a system by using a safety integrity level. The SIL level of a system defines how much improvement in the probability to perform on demand the system exhibits over a similar control system without the SIL rated functions. For example, a system rated as SIL 2 would improve the probability to perform on demand over a basic system by a factor of greater than or equal to 100 times and less than 1000 times.

One issue with attaining a safety integrity level rating for subsea hydraulic equipment is lack of ability to test each valve in the system and ascertain its functionality without retrieving the valve from the sea floor. BOP systems often utilize several valves working together to activate a function in a single circuit. While some have suggested placing diagnostics on each and every valve in a BOP system, such a solution is impractical and difficult to execute in practice.

SUMMARY

Embodiments of the invention utilize back pressure and a reduced number of sensors to carry out a proof test in a BOP system. Therefore, disclosed is a blowout preventer (BOP) safety system for testing the integrity of hydraulic safety valves at the sea floor. The system includes a BOP stack including a BOP, the BOP comprising a BOP shear ram; a first hydraulic circuit, the first hydraulic circuit in fluid communication with the BOP shear ram and having an open side and a close side; and a manifold, wherein the manifold is disposed proximate to and in fluid communication with a dump valve, a first sensor, and a supply valve. The system further includes a first safety valve disposed between and in fluid communication with the manifold and the BOP on the close side, wherein the dump valve is operable to allow flow from the BOP to the manifold through the safety valve, and wherein the first sensor is operable to detect the flow from the BOP to the manifold.

Additionally disclosed is a method for testing the integrity of safety valves on a blowout preventer (BOP) at the sea floor. The method includes the steps of pressurizing a manifold to increase pressure in the manifold; detecting a first pressure increase in the manifold; decreasing the pressure in the manifold to less than the pressure in a BOP bonnet fluidly coupled to the manifold; opening a valve disposed between the BOP bonnet fluidly coupled to the manifold and the manifold to allow flow from the BOP bonnet to the manifold; detecting a second pressure increase in the manifold; closing the valve; re-pressurizing the manifold; and presenting a pass or fail test message for the integrity of the valve.

Further disclosed is a BOP safety characterization system to enhance safety and reliability testing of BOP's in a subsea application. The system includes a BOP stack, in electrical communication with a surface computing unit and a processing unit disposed within the surface computing unit, including a processor, operable to receive an electrical signal from the BOP stack. The processing unit is in communication with and includes non-transitory, tangible memory medium in communication with the processor having a set of stored instructions, the set of stored instructions being executable by the processor and including the steps of: performing pressure testing on the BOP stack and maintaining pressure in one or more BOP's of the BOP stack; pressurizing a manifold; detecting a first pressure increase in the manifold; releasing pressure in the manifold via a valve to de-pressurize the manifold to about atmospheric pressure responsive to detecting the first pressure increase in the manifold; allowing fluid flow between one or more BOP's of the BOP stack and the manifold; detecting a second pressure increase in the manifold; and displaying a test pass or test fail message to a display readable by a user responsive to detecting the first and second pressure increases in the manifold.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION OF THE DISCLOSURE

So that the manner in which the features and advantages of the embodiments of proof testing systems and methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
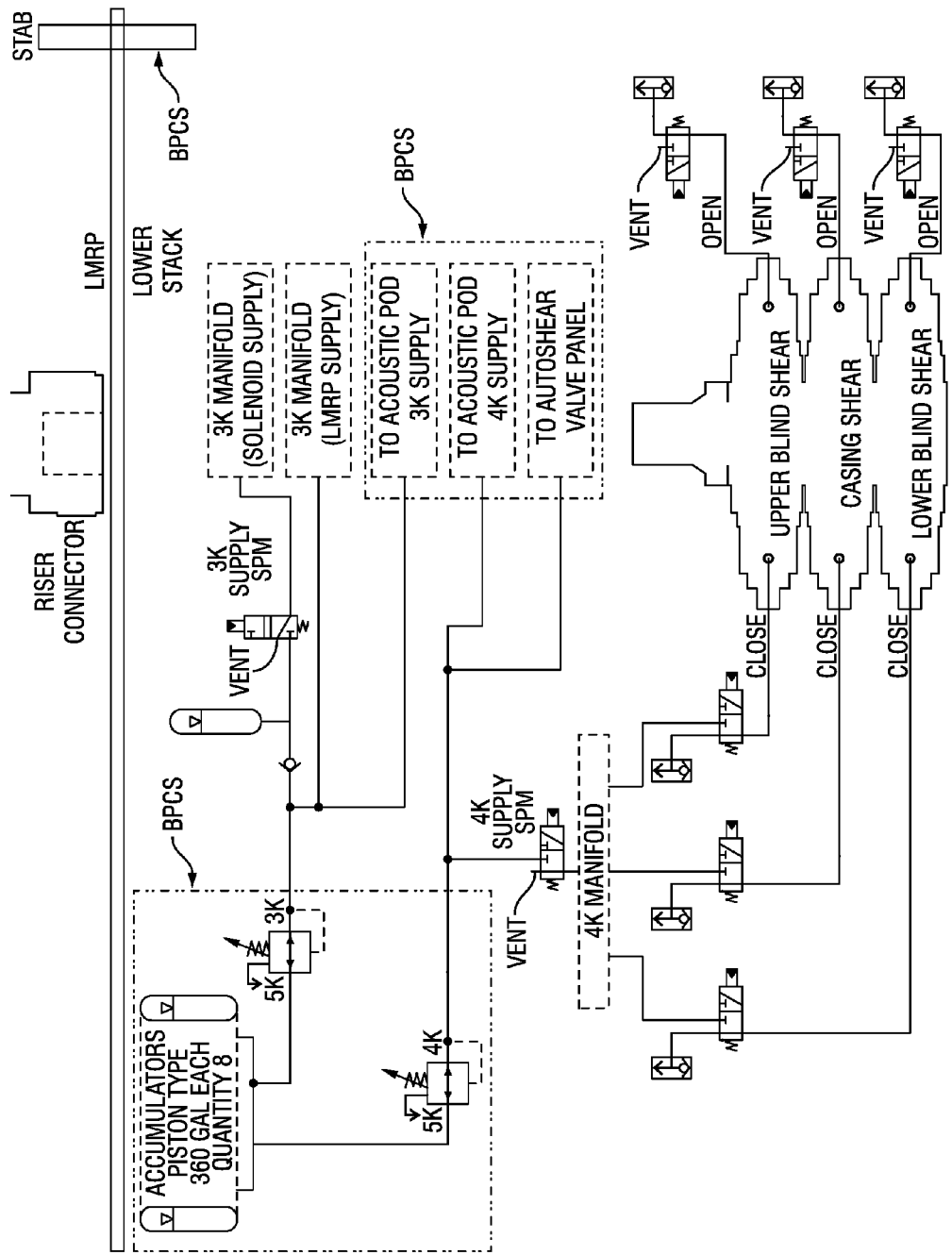
FIG. 1 is a schematic of a BOP hydraulic drive circuit with uniquely placed safety valves and manifolds.

Referring first to FIG. 1, a schematic is shown of a BOP hydraulic drive circuit with uniquely placed safety valves and manifolds. The hydraulic drive circuit of FIG. 1 is described in more detail with regard to FIG. 2. FIG. 1 shows one example placement of valves that enable the redundancy required to achieve a safety rated system. As noted previously, one issue with attaining a safety rating for subsea hydraulic equipment is the lack of ability to test each valve in the system and ascertain its functionality without retrieving the valves from the sea floor. Advantageously, the present disclosure allows BOP safety systems to be tested during the period the system is being pressure tested while it is subsea. Such a solution alleviates the problem of adding many redundant valves and sensors, and avoids requiring the BOP stack to be pulled to the surface for testing on a periodic basis.

However, FIG. 1 lacks a sufficient number sensors to determine whether the valves are operating sufficiently subsea. In the embodiment of FIG. 1, one way to fully determine if the valves are all working is to fire the BOP shear rams. One potential problem with the system of FIG. 1 is that firing a BOP tends to degrade the system and increase the required rebuild frequency of the device. One solution to this problem is to leverage the pressure test frequency that already occurs on the rig, as required by American Petroleum Institute (API) regulations for high-pressure high-temperature (HPHT) equipment.

Figure 2:
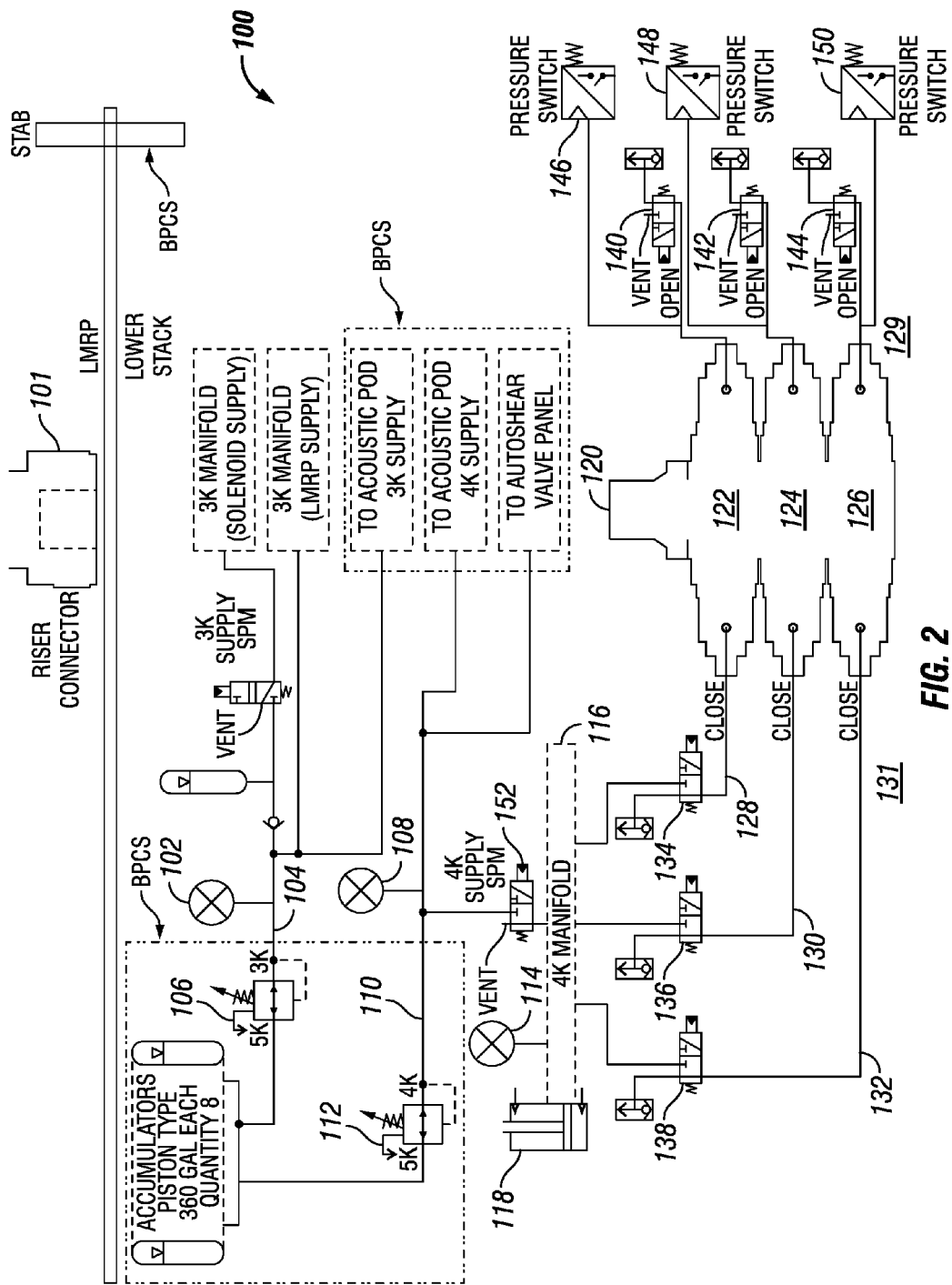
FIG. 2 is a schematic of the BOP hydraulic drive circuit of FIG. 1 including proof test sensors.

Referring now to FIG. 2, a schematic is shown of a BOP hydraulic drive circuit with proof test sensors. In BOP safety system 100, several pressure sensors and valves, unique to the embodiments of the present disclosure, are utilized to allow proof testing from the surface. FIG. 2 largely shows a lower stack portion of a blowout preventer, disposed beneath a LMRP, or lower marine riser package. A riser connector 101 is disposed proximate the LMRP above the lower stack.

Figure 3:
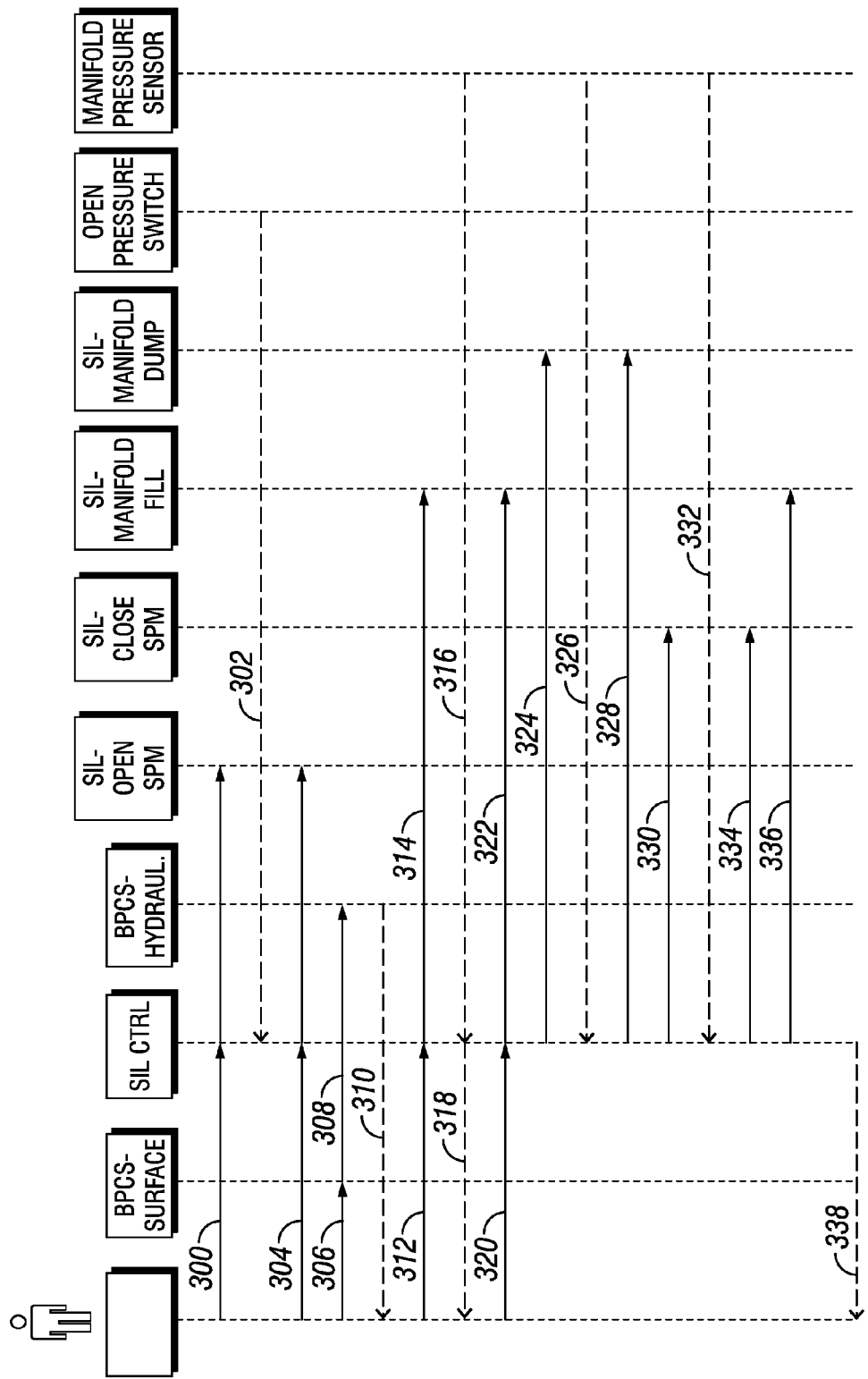
FIG. 3 is a sequence diagram for proof testing in an example method, optionally carried out on the BOP hydraulic drive circuit of FIGS. 1-2.

Certain example sensors and sensor placements are described as follows. While example sensors will be referred to, such as, for example, pressure gauges and pressure switches, one of ordinary skill in the art will understand that other suitable gauges, switches, and/or sensors could be used, such as flow meters, flow detectors, and/or acoustic sensors. Moreover, one of ordinary skill in the art will realize alternative placements and combinations of proof sensors are possible in a BOP hydraulic drive circuit. In the embodiments of FIGS. 2 and 3, BPCS signifies a basic process control system.

BOP safety system 100 includes a transducer or transmitter 102 to measure characteristics, such as pressures, at an output 104 of a 3,000 psi (3K) regulator 106 for continuous diagnostics. Transducer or transmitter 102, in some embodiments, is a pressure gauge or a pressure switch. BOP safety system 100 further includes a transducer or transmitter 108 to measure pressures at an output 110 of a 4,000 psi (4K) regulator 112 for continuous diagnostics. Transducer or transmitter 108, in some embodiments, is a pressure gauge or a pressure switch. While the regulators discussed in the figures include 3K and 4K regulators, any other regulators can be used in systems and methods of the present disclosure including for example, but not limited to, 1.5K, 5K, and/or 7K regulators.

BOP safety system 100 further includes a transducer or transmitter 114 to measure characteristics, such as the pressure or presence of fluid, in a 4K manifold 116. Transducer or transmitter 114, in some embodiments, is a pressure gauge or a pressure switch. Also shown in FIG. 2 is a valve 118, for example a dump valve, disposed proximate to and in fluid communication with the 4K manifold 116. Valve 118 is in fluid communication with the 4K manifold 116 to relieve pressure in the 4K manifold 116 during testing methods of the present disclosure, described as follows herein.

In FIG. 2, a BOP 120 includes BOP upper blind shear ram 122, BOP casing shear ram 124, and BOP lower blind shear ram 126. BOP upper blind shear ram 122 is in fluid communication with circuit 128, BOP casing shear ram 124 is in fluid communication with circuit 130, and BOP lower blind shear ram 126 is in fluid communication with circuit 132. As shown, each circuit 128, 130, 132 has an open side 129 and a close side 131. Sub-plate mounted (SPM) valves 134, 136, 138 are shown on the close side 131 of the circuits 128, 130, 132. SPM valves 140, 142, 144 are shown on the open side 129 of the circuits 128, 130, 132. Pressure switches 146, 148, 150 are disposed proximate to and in fluid communication with the open side 129 of each circuit 128, 130, 132 to detect pressure. As mention previously, other sensors in addition to or alternative to pressure switches 146, 148, 150 could be used in other embodiments.

Processes for using sensor units, such as for example, units 102, 108, 114, 146, 148, 150 in FIG. 2, to determine if valves in BOP safety system 100 are operating properly and safely is one advantage provided by embodiments of the present disclosure. Certain advantageously placed sensor units are used for continuous diagnostics, such as transducers or transmitters 102, 108, and provide the ability of the system to alarm if either of the regulators 106, 112 fail.

Referring now to FIG. 3, a sequence diagram is shown for proof testing in an example method, optionally carried out on the BOP hydraulic drive circuit of FIG. 2. Pressure switches 146, 148, 150 on the open side 129 of circuits 128, 130,132 are uniquely applied in embodiments of subsea testing methods. At a first step 300 in an example testing method exemplified by FIG. 3, pressure on the open side 129 is dumped or released by opening one or more valves to test the one or more valves on the open side 129. As represented by step 300, an SPM valve can be opened, such as SPM valve 140. For example, for testing SPM valve 140 on circuit 128, when the basic process control system has BOP 120 open, including BOP upper blind shear ram 122, pressure is applied to the open side 129 of circuit 128. To test a safety valve in circuit 128, such as SPM valve 140, a safety open valve can be operated while the BOP 120 is open.

At step 302, a pressure switch, such as pressure switch 146, will transition from seeing elevated pressure to not seeing elevated pressure after the pressure is released or dumped at step 300 by opening SPM valve 140, and the pressure switch 146 will provide feedback that the valve actually moved from a closed position to an open position. At step 304, the valve, such as SPM valve 140, can then be returned to its normal operational state, which will reapply pressure to the open side 129, also referred to as an open port, of BOP upper blind shear ram 122. This process allows verification that the open side safety valve actually moved, without modifying the valve itself to have additional diagnostic equipment and without removing the valve from the BOP safety system 100 or sea floor. This process does not apply any hydraulic closing pressure to the BOP safety system 100, so the BOP 120 itself does not move during the proof test and no wear is caused on the BOP.

Testing a valve set on the close side of a BOP requires an interaction with a basic process control system. Shearing BOP's in general have low pressure and high pressure closing circuits. Normally, to close a BOP when the system is not shearing, any material low pressure (for example about 1,500 psi) can be applied. The low pressure is used because it reduces the wear on the components and extends the life of the BOP. When a BOP is closed during a shearing event, the high pressure (for example about 4,000 psi) circuit can be used. High pressure increases the force on the shearing blades, thereby improving the likelihood that the BOP will shear (when a pipe is present during operation) and close. Safety systems, such as BOP safety system 100, apply only a high pressure circuit. There is no low pressure circuit included in the design of safety systems.

API standards for high-pressure high-temperature (HPHT) equipment require that basic process control systems and BOP's be pressure tested at intervals of 3 weeks or less. One solution for proof testing the safety systems on BOP's is to integrate the proof test with the API-required pressure testing, as described herein. API-required testing uses the basic process control system to close the BOP with a low pressure close circuit. The BOP, such as BOP 120, is then pressured up. When the test is complete, the BOP is opened and the system is put back in service. For example, in FIG. 3 at step 306 the API test begins when BOP upper blind shear ram 122 is closed, and at step 308 a high pressure test is run according to API standards. At step 310, the API test is complete, and further testing according to methods of the present disclosure is carried out.

To proof test sub-plate mounted (SPM) valves in the close side of the safety circuit, the 21 day (3 week) API pressure test is modified as follows. Here, referring to BOP upper blind shear ram 122 by example, after the API test, BOP upper blind shear ram 122 remains closed, having been closed by the low pressure circuit through the basic process control system during step 306 of the API test. As explained above with regard to steps 306, 308, 310, BOP safety system 100 is pressured up, and the test is passed. Afterward at step 312, BOP safety system 100 begins a test for a manifold fill valve 152 by opening the manifold fill valve 152 at step 314 and uses transducer or transmitter 114, such as, for example a pressure sensor such as a pressure gauge or pressure switch, to confirm the manifold 116 pressures up to 4K psi at step 316. Once the manifold pressures up to 4K psi at step 316, a test passed message is displayed at step 318. In the method exemplified by FIG. 3, method steps can be automated and carried out by a computer readable medium or carried out by a user. Results can be applied to carry out subsequent steps and/or can be displayed to a user at the surface.

In certain embodiments of BOP safety systems, there are three logic solvers, one on the surface and two sub-sea. A user interface will be provided on the surface that would allow the user to run safety and testing processes. Alternatively, the process could be documented in a maintenance manual and the user interface could allow the user control over individual valves. In both cases, there is some initiation from the surface to run the test or parts of the test.

At step 320, a test for a BOP SIL close valve, such as SPM valve 134 begins. At step 322, the manifold fill valve 152 is closed by BOP safety system 100, and at step 324, valve 118, for example a dump valve or vent valve, dumps the pressure from the manifold 116. The pressure in manifold 116 drops to about atmospheric pressure. At step 326, a pressure drop in the manifold 116 is confirmed by transducer or transmitter 114, and at step 328, valve 118 is returned to a closed state. At this point in the process the BOP close circuit side of circuit 128 still has about 1,500 psi in the bonnet of BOP upper blind shear ram 122, and is being held closed by the combination of this pressure and the multi-position lock that is integral to the BOP. As noted, the manifold 116 has been returned to about ambient pressure after the pressure was dumped at step 324.

For shearing, BOP's typically contain two blades, which are pushed together by two pistons (sometimes referred to as piston operators). Bonnets are housings for the pistons where the hydraulic fluid enters and exits a BOP assembly. In certain embodiments, when a BOP is closed, the control system maintains hydraulic pressure on the close side of the piston operator(s). However, a mechanical locking mechanism (sometimes referred to as an "MPL") is also present to hold the BOP closed in the event of hydraulic pressure loss.

At step 330, the safety system opens the SPM valve 134 on the close side 131 of circuit 128 for BOP upper blind shear ram 122. Since the bonnet of BOP upper blind shear ram 122 has 1,500 psi and the manifold 116 is at ambient pressure, opening the SPM valve 134 will create a reverse flow from the BOP upper blind shear ram 122 bonnet to the manifold 116. At step 332, the transducer or transmitter 114 disposed proximate to and in fluid communication with the manifold 116 can be used to confirm that the SPM valve 134 moved by sensing a change in pressure. At step 334, SPM valve 134 on the close side 131 of circuit 128 can then be returned to the operational (closed) state. At step 336, the manifold fill valve 152 is opened, and the basic process control system can return the BOP upper blind shear ram 122 to the open position. This allows the system to return to the drilling mode of operation. At step 338, a pass or fail test message is displayed to a user. One advantage of this methodology over simply driving the bonnet of BOP upper blind shear ram 122 up to 4K psi to test safety valves is that the additional stress of the high pressure is never applied to the BOP bonnet extending the life and improving the maintenance cycle.

Proof tests of the present disclosure are enabled, in part, by the MPL. As noted, the bonnet of BOP upper blind shear ram 122 has 1,500 psi and the manifold 116 is at ambient pressure, so opening the SPM valve 134 will create a reverse flow from the BOP upper blind shear ram 122 bonnet to the manifold 116. Testing a close side valve, such as SPM valve 134, intentionally dumps the pressure from the closed side of the bonnet. During that process, the MPL holds the BOP closed until hydraulic pressure is reapplied to the bonnet.

While the method of FIG. 3 was described largely with regard to FIG. 2 and the BOP upper blind shear ram 122 along with circuit 128, the methodology can be modified by one of ordinary skill in the art to apply backpressure testing to other systems and other BOP rams, such as, for example, BOP casing shear ram 124 and BOP lower blind shear ram 126.

Moreover, while certain figures and claims recite embodiments of the present invention with regard to BOP rams, one of ordinary skill in the art could apply the proof testing algorithm to an annular BOP. The proof testing algorithm for an annular is slightly modified. As noted above, ram preventers have a multi-position lock (MPL) that keeps them closed when the closed side pressure is vented. Annular BOP's do not have this feature. Using a manifold of sufficiently small volume compared to the hydraulic chamber volume of an annular BOP, one of ordinary skill can implement a substantially similar process in an annular. By sizing the manifold with respect to the annular BOP volume, one of ordinary skill could measure a pressure change in the manifold without risk of venting all the pressure holding the annular closed.

In the various embodiments of the disclosure described, a person having ordinary skill in the art will recognize that various types of memory are readable by a computer, such as the memory described in reference to various computers and servers, e.g., computer, computer server, web server, or other computers with embodiments of the present disclosure.

The singular forms "a," "an," and "the" include plural referents, unless the context clearly dictates otherwise.

Examples of computer-readable medium can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

The invention claimed is:

1. A blowout preventer (BOP) safety system for testing integrity of safety valves at the sea floor, the system comprising:
    a BOP, the BOP comprising a BOP shear ram;
    a first hydraulic circuit, the first hydraulic circuit in fluid communication with the BOP shear ram and having an open side and a close side;
    a manifold, wherein the manifold is disposed proximate to and in fluid communication with a dump valve, a first sensor, and a supply valve;
    a first safety valve disposed between and in fluid communication with the manifold and the BOP on the close side, wherein the dump valve is operable to allow flow from the BOP to the manifold through the first safety valve, and wherein the first sensor is operable to detect the flow from the BOP to the manifold;
    a second safety valve disposed on the open side and in fluid communication with the BOP;
    a second sensor, wherein the second sensor is operable to detect a change when the second safety valve is changed between an opened and closed position; and
    a third sensor to measure characteristics at an output of a first hydraulic regulator for continuous diagnostics.

2. The BOP safety system according to claim 1, further comprising a fourth sensor to measure characteristics at an output of a second hydraulic regulator for continuous diagnostics.

3. The BOP safety system according to claim 1, wherein the BOP shear ram is an upper blind shear ram, and further comprising:
    a casing shear ram;
    a second hydraulic circuit, the second hydraulic circuit in fluid communication with the casing shear ram and having an open side and a close side; and
    a third safety valve disposed between and in fluid communication with the manifold and the BOP on the close side of the second hydraulic circuit, wherein the dump valve is operable to allow flow from the BOP to the manifold through the second safety valve, and wherein the first sensor is operable to detect the flow from the BOP to the manifold.

4. The BOP safety system according to claim 3, further comprising:
    a lower blind shear ram;
    a third hydraulic circuit, the third hydraulic circuit in fluid communication with the lower blind shear ram and having an open side and a close side; and
    a fourth safety valve disposed between and in fluid communication with the manifold and the BOP on the close side of the third hydraulic circuit, wherein the dump valve is operable to allow flow from the BOP to the manifold through the third safety valve, and wherein the first sensor is operable to detect the flow from the BOP to the manifold.

5. The BOP safety system according to claim 4, further comprising:
    a fifth safety valve disposed on the open side and in fluid communication with the BOP proximate the upper blind shear ram;
    a sixth safety valve disposed on the open side and in fluid communication with the BOP proximate the casing shear ram;
    a seventh safety valve disposed on the open side and in fluid communication with the BOP proximate the lower blind shear ram;
    a third sensor operable to detect a change when the fifth safety valve is changed between an opened and closed position;
    a fourth sensor operable to detect a change when the sixth safety valve is changed between an opened and closed position; and
    a fifth sensor operable to detect a change when the seventh safety valve is changed between an opened and closed position.

6. The BOP safety system according to claim 5, wherein the sensors are selected from the group consisting of: a pressure gauge, a pressure switch, and combinations thereof.

7. The BOP safety system according to claim 1, wherein the dump valve is operable to allow flow from the BOP to the manifold through the first safety valve, and wherein the first sensor is operable to detect the flow from the BOP to the manifold when the BOP shear ram is closed after BOP testing.

8. A method for testing integrity of safety valves on a blowout preventer (BOP) at the sea floor, the method comprising the steps of:
    pressurizing a manifold to increase pressure in the manifold;
    detecting a first pressure increase in the manifold;

decreasing the pressure in the manifold to less than the pressure in a BOP bonnet fluidly coupled to the manifold;
opening a valve disposed between the BOP bonnet fluidly coupled to the manifold and the manifold to allow flow from the BOP bonnet to the manifold;
detecting a second pressure increase in the manifold;
closing the valve;
re-pressurizing the manifold; and
presenting a pass or fail test message for integrity of the valve.

9. The method according to claim 8, further comprising the steps of:
releasing pressure on an open side of a circuit on the BOP;
detecting a pressure drop on the open side; and
re-pressurizing the open side.

10. The method according to claim 9, further comprising the steps of:
closing a ram of the BOP; and
running a high pressure integrity test on the BOP.

11. The method according to claim 9, further comprising the step of:
measuring characteristics of the BOP at an output of a first hydraulic regulator for continuous diagnostics.

12. The method according to claim 11, further comprising the step of:
measuring characteristics of the BOP at an output of a second hydraulic regulator for continuous diagnostics.

13. The method according to claim 10, wherein the step of decreasing the pressure in the manifold to less than the pressure in a BOP bonnet fluidly coupled to the manifold is carried out using a dump valve disposed proximate to and in fluid communication with the manifold.

14. The method according to claim 8, wherein the steps of detecting the first pressure increase and the second pressure increase in the manifold are carried out using a pressure sensor disposed proximate to and in fluid communication with the manifold.

15. The method according to claim 8, wherein the steps of the method are carried out subsequent to high pressure BOP testing.

16. The method according to claim 9, wherein the steps of releasing pressure on an open side of a circuit on the BOP; detecting a pressure drop on the open side; and re-pressurizing the open side are carried out prior to high pressure BOP testing.

17. A blowout preventer (BOP) safety characterization system to enhance safety and reliability testing of BOP's in a subsea application, the system comprising:
a BOP stack, the BOP stack in electrical communication with a surface computing unit;
a processing unit disposed within the surface computing unit, including a processor, operable to receive an electrical signal from the BOP stack, the processing unit in communication with and comprising:
non-transitory, tangible memory medium in communication with the processor having a set of stored instructions, the set of stored instructions being executable by the processor and including the steps of:
performing pressure testing on the BOP stack and maintaining pressure in one or more BOP's of the BOP stack;
pressurizing a manifold;
detecting a first pressure increase in the manifold;
releasing pressure in the manifold via a valve to de-pressurize the manifold to about atmospheric pressure responsive to detecting the first pressure increase in the manifold;
allowing fluid flow between the one or more BOP's of the BOP stack and the manifold;
detecting a second pressure increase in the manifold; and
displaying a test pass or test fail message to a display readable by a user responsive to detecting the first and second pressure increases in the manifold.

18. The system according to claim 17, wherein the set of stored instructions being executable by the processor further includes the steps of:
dumping or releasing pressure on an open side of the BOP stack to test one or more valves on the open side;
detecting decreased pressure after the pressure is dumped or released at the open side of the BOP stack; and
reapplying pressure to the open side of the BOP stack.

* * * * *